United States Patent
Di Matteo et al.

[11] 3,936,649
[45] Feb. 3, 1976

[54] METHOD AND APPARATUS FOR USE IN POSITION DETERMINING

[76] Inventors: Paul L. Di Matteo, 6 Carol Court, Dix Hills, N.Y. 11746; Joseph A. Ross, 26 Trescott Path, Fort Salonga, N.Y. 11768; Howard K. Stern, 89 Derby Ave., Greenlawn, N.Y. 11740

[22] Filed: July 22, 1974

[21] Appl. No.: 490,875

[52] U.S. Cl. .................................. 250/558; 356/2
[51] Int. Cl.² ...................................... G01C 11/12
[58] Field of Search ............ 250/558, 199; 356/2, 5, 356/6, 141, 152; 340/25, 29

[56] References Cited
UNITED STATES PATENTS

| | | | |
|---|---|---|---|
| 3,578,863 | 5/1971 | Farrand | 356/5 |
| 3,614,237 | 10/1971 | Kyle et al. | 356/2 |
| 3,663,104 | 5/1972 | Godfrey | 250/558 |
| 3,704,070 | 11/1972 | Johnson et al. | 356/152 |
| 3,783,294 | 1/1974 | Koder | 250/558 |
| 3,799,675 | 3/1974 | Johnson et al. | 356/152 |

Primary Examiner—Archie R. Borchelt
Assistant Examiner—D. C. Nelms
Attorney, Agent, or Firm—Watson Leavenworth Kelton & Taggart

[57] ABSTRACT

Reticle structure defining a succession of contiguous cells, separately discernible upon illumination thereof, is spacedly positioned relative to a discernible indicium, such as a light source. The indicium is disposed in a known location relative to the reticle structure and the cells and indicium are viewed jointly from a given location. Information is derived for use in determining the positional coordinates of the given location with respect to the indicium.

16 Claims, 15 Drawing Figures

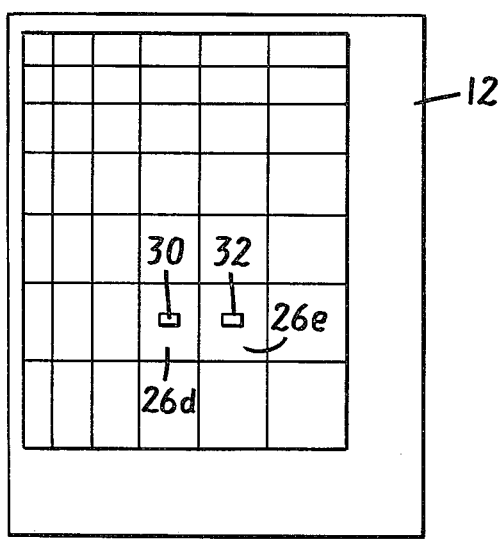
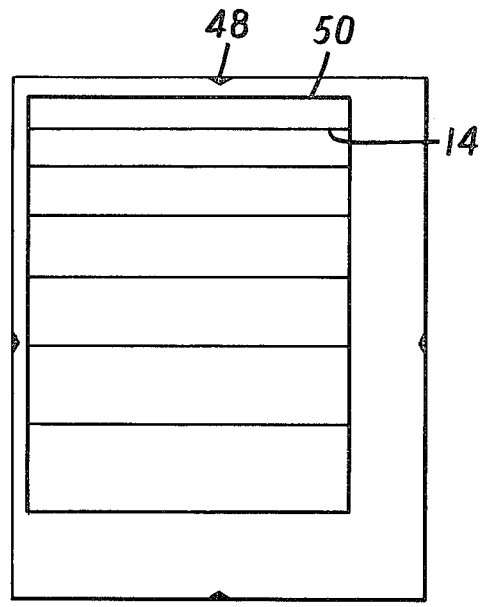
FIG. 3　　　　　　　　FIG. 4
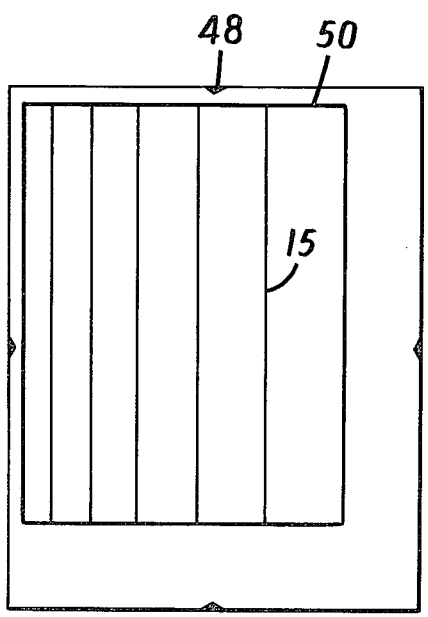
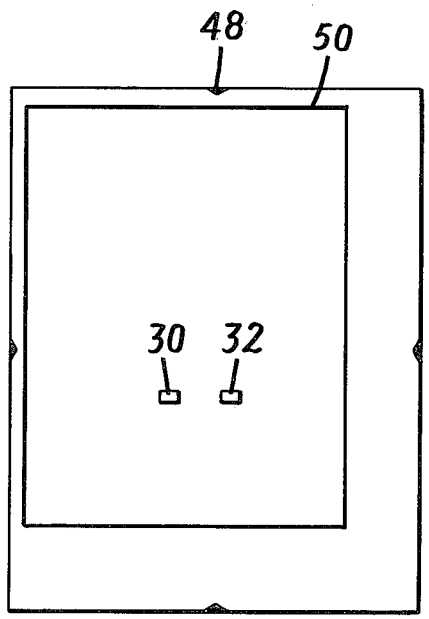
FIG. 5　　　　　　　　FIG. 6

METHOD AND APPARATUS FOR USE IN POSITION DETERMINING

FIELD OF THE INVENTION

This invention relates to apparatus and methods for use in determining the positional coordinates of an unknown location and more particularly to position determining apparatus and methods for use in photographic studies of objects.

BACKGROUND OF THE INVENTION

In various photographic studies, knowledge of the positional coordinates of the lens node of a camera is of particular interest. By way of example, in a recently developed method for three-dimensional object reproduction, disclosed in commonly-assigned copending application Ser. No. 412,162, steps are disclosed for the generation, from examination of a specially derived photograph, of electrical signals selectively identifying that light ray or optical path, in a bundle of rays or paths extending from a camera lens to an object, which is in viewing relation to a given object surface boundary point of interest. Where the positional coordinates of the location of the camera lens node are known, such signals are useful in reconstructing the point of interest in exacting spatial relation to other points cooperatively defining the entire object surface boundary.

In the event that environmental disturbances, such as vibration, or intended camera movement, occur in the practice of the particularly referenced method, and where exacting object reproduction is desired, it is necessary to redetermine the initial, tediously determined positional coordinates of the location of the camera lens node. Given such conditions in the referenced and other methods, need exists for apparatus and methods facilitating ready determination and redetermination of camera lens node position.

SUMMARY OF THE INVENTION

The present invention has as its primary object the provision of improved apparatus and methods for use in position determination.

A more particular object of the invention is to provide methods and apparatus for facilitating determination and redetermination of the positional coordinates of the locations of a camera lens node in the course of photographically-assisted reproduction of three-dimensional objects.

The foregoing and other objects of the invention are attained, as respects multiple positional coordinate determination, by the provision of apparatus comprising reticle means for defining a plurality of contiguous separately discernible extents of a field of view (cells), means for defining at least two discernible indicia, and means for positioning the reticle means and the indicia defining means for discernment of each of the indicia jointly with a one of the cells through the separate optical paths between the indicia and a given viewing location whose positional coordinates are unknown. In a basic method of the invention, the indicia are disposed in locations having known positional coordinates. Each indicium is then discerned jointly with one cell, preferably by study of a photograph of the reticle means and the indicia taken from the location having unknown positional coordinates, for example, the lens node whose positional coordinates are unknown. Signals may be generated from the photograph which are indicative, for each axis of interest, of the number of cells in the reticle means along such axis and the order in such succession of the cell jointly discernible with each indicium. Preferred reticle means incorporates structure providing for ready determination of errors in cell identification and for correction thereof.

The foregoing and other objects and features of the invention will be evident from the following detailed description of preferred embodiments and practices of the invention and from the drawings thereof.

DESCRIPTION OF THE DRAWINGS

FIG. 3 is a photograph of the apparatus of FIG. 1 taken from a location different from the location referred to in FIG. 2.

FIGS. 4 through 6 depict photographs each representing a separate part of the composite information contained in the FIG. 3 photograph.

DESCRIPTION OF PREFERRED EMBODIMENTS AND PRACTICES

Figure 1:
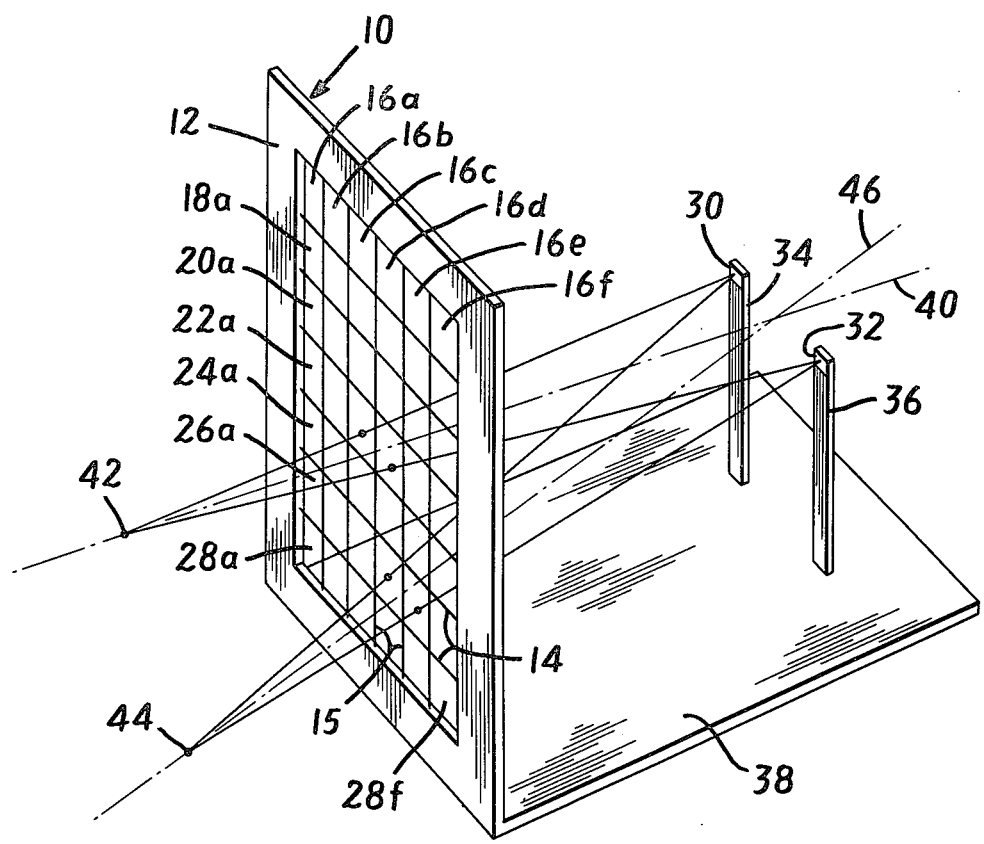
FIG. 1 is a perspective view of one embodiment of apparatus according with the invention.

Referring to FIG. 1, reticle 10 includes a frame 12 having a transparent central expanse in which are supported lateral and longitudinal grid elements 14 and 15 cooperatively defining a plurality of contiguous separately discernible extents (cells) $16a$ through $28f$ of a field of view. Frame 12 may be of opaque material and grid elements 14 and 15 may comprise relatively thick wires such that they also may be opaque to light or other energy incident on reticle 10. The grid elements may alternatively be substantially transparent devices, for example, fine wire filaments, which are discernible only upon energization thereof. In the illustrated embodiment, the cells are of equal extent, having common lateral and longitudinal dimensions, but may be of random extents as discussed below.

Discernible indicia 30 and 32 are provided at the upper portions of support arms 34 and 36, the latter being secured in base 38. Base 38 supports reticle 10 and the indicia in spaced relation for reasons discussed below. The support arms are desirably transparent to radiant energy employed in the discernment of the indicia and the reticle cells.

When indicia 30 and 32 are viewed through reticle 10 along an axis, for example, axis 40, symmetrical to both the reticle and the indicia, the indicia are discernible with different ones of cells $22a$ through $22f$, depending on the viewing location along axis 40. From a given location 42 along axis 40, the indicia are respectively discernible jointly with cells $22c$ and $22d$. Where location 42 is the location of a lens node, a photograph of the reticle and indicia taken with such lens is shown in FIG. 2.

Figure 2:
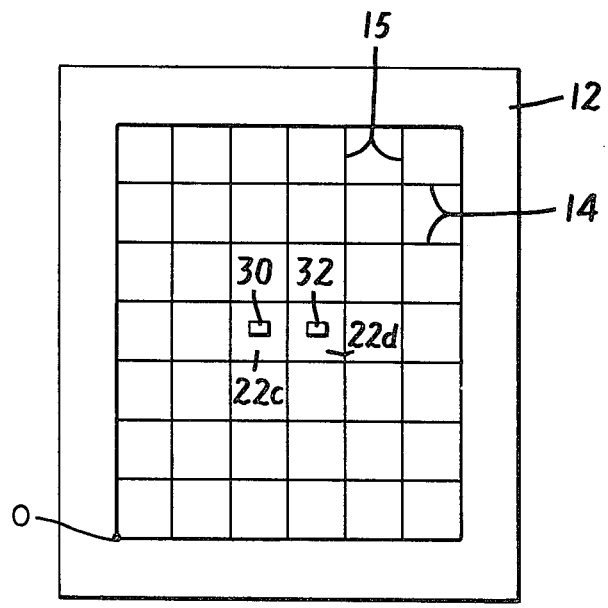
FIG. 2 is a photograph of the apparatus of FIG. 1 taken from a location along an axis symmetrical to the reticle means and the indicia thereof.

Referring to FIG. 2, $x$ and $y$ positional coordinates of each indicium relative to the reticle origin O can be readily defined by observing the number of cells in succession along the $x$ and $y$ axis and determining the order in such successions of the cell jointly discerned with such indicium. Where indicia 30 and 32 are disposed in locations having known positional coordinates, the absolute positional coordinates of the cells of the reticle discernible jointly with the indicia can be readily determined for the positional coordinates of location 42 since the z-axis spacing of the indicia relative to the reticle and the reticle geometry are known.

Where the indicia are viewed through the reticle from a location 44 along an axis 46 other than axis 40, and a photograph of such viewing is made (FIG. 3), the reticle cells jointly discernible with the indicia undergo a shift from the aforesaid cells 22c and 22d to cells 26d and 26e, respectively. Such shifting is attributable to the fact that z-axis spacing exists between the reticle and the indicia. The x and y positional coordinates of cells 26d and 26e being known relative to the positional coordinates of indicia 30 and 32 and the z-axis spacing of the indicia and reticle being known, the x, y and z positional coordinates of location 44 relative to the reticle structure can be determined by triangulation. As will be appreciated, the reticle may contain a sufficient number of cells for a given application such that interpolation of apparent locations of indicia within a given cell is unnecessary.

While the foregoing discussion has considered a reticle having cells disposed in successions along two axes, the invention may be practiced through the use of a single axis reticle. Thus, in instances where location change is restricted to viewing locations sharing two positional coordinates and departing solely along a "shift" axis in the third positional coordinate, a suitable reticle may comprise a succession of contiguous cells along such an axis parallel to the shift axis and a single indicium supported in spaced relation to the reticle along an axis orthogonal to the shift axis. In use of such single axis reticle, determinations are made of the cell with which the indicium is jointly discernible from locations of interest along the shift axis.

The invention is practiced more suitably than the above-discussed manipulative practice by the generation of electrical signals indicative of the parameters involved. Such signals enable the use of automatic data processing techniques in solution of the triangulation involved. In such data processing practice, which is not a part of the present invention, digital signals are generated, for example, by suitable card punching, of the invariant parameters, namely, the reticle structure (cell size and arrangement) and the relative positioning of the reticle structure and indicia. Then, information is provided through the present invention concerning the dispositions within the reticle of the cells jointly discerned with the indicia from the unknown location, e.g., cells 22c and 22d for location 42 or cells 26d and 26e for location 44. The latter digital signals may comprise, for each different axial disposition of such as cells 22c and 22d within the reticle, a signal having a plurality of predetermined serial time extents in number corresponding with the number of cells along an axis and a pulse (1) in the one of the time extents for indicating the order of the cell in the succession. In the illustrative situation, the pulse pattern indicating the y-axis disposition from origin O of both cells 22c and 22d is 0001000. The pulse patterns 001000 and 000100 respectively indicate the x-axis disposition from origin O of cells 22c and 22d.

Each of FIGS. 4–6 depicts a photograph including a selective part of the information content of the FIG. 3 photograph. Thus, FIG. 4 shows the lateral grid elements 14 of FIG. 3, FIG. 5 shows the longitudinal grid elements 15 of FIG. 3 and FIG. 6 depicts indicia 30 and 32 in their FIG. 3 disposition. All of the FIGS. 4–6 photographs include film frame reference marks 48.

The FIGS. 4–6 photographs may be derived, for example, by use of the alternate reticle above-discussed. In deriving the FIG. 4 photograph the indicia and the filaments defining the longitudinal grid elements are deenergized while the filaments defining lateral grid elements are energized. In deriving the FIG. 5 photograph, only the filaments defining the longitudinal grid elements are energized. In deriving the FIG. 6 photograph, the indicia are alone energized.

Figure 7A:
FIGS. 7(a)–(f) show signals generated in accordance with the invention.
Figure 7B:

The FIG. 4 photograph is examined by scanning, e.g., photoelectrically, along an axis transverse to the representations therein of lateral grid elements 14. A pulse is generated as frame border 50 and each of such element 14 representations are encountered in scanning, the pulses being spaced in time in direct proportion to the photographic spacing where the scanner is moved at a uniform rate. The pulses are stored as derived, i.e., with indication of time slots therebetween, as shown in FIG. 7(a). The FIG. 5 photograph is likewise examined by scanning along an axis transverse to the representations therein of longitudinal grid elements 15. The resulting pulse train is shown with its time slot indication in FIG. 7(b).

The FIG. 6 photograph is examined by separate scanning operations in x and y for its indicia representations and signals are generated, each comprising a pulse, derived on indicium representation sensing, and spaced in a scanning time base according with one of the scanning time bases of the signals derived from FIG. 4 and FIG. 5.

Figure 7C:
Figure 7D:
Figure 7E:

FIG. 7(c) shows the results of x scanning for indicia representations, the pulses therein respectively indicating the x-axis returns for indicia 30 and 32. Taken together, the pulses of FIGS. 7(b) and 7(c) establish the x-axis positional relationship between the indicia and the reticle cells as seen from the viewing location. FIGS. 7(d) and 7(e) show the results of y scanning for indicia representations, the pulses therein respectively indicating the y-axis returns for indicia 30 and 32 to be the same. Taken together, the pulses of FIGS. 7(a), 7(d) and 7(e) establish the y-axis positional relationship between the indicia and the reticle cells as seen from the viewing location. In the example at hand, correlation is found between the indicia 30 x return in FIG. 7(c) and the fourth time slot of the FIG. 7(b) signal and between the indicia 30 y return in FIG. 7(d) and the second time slot of the FIG. 7(a) signal. There being respectively six and seven time slots in the FIG. 7(b) and FIG. 7(a) signals, pulse patterns 000100 (x) and 0100000 (y) may be derived for indicia 30. For indicia 32, the pulse patterns are 000010 (x) and 0100000 (y).

Figure 8:
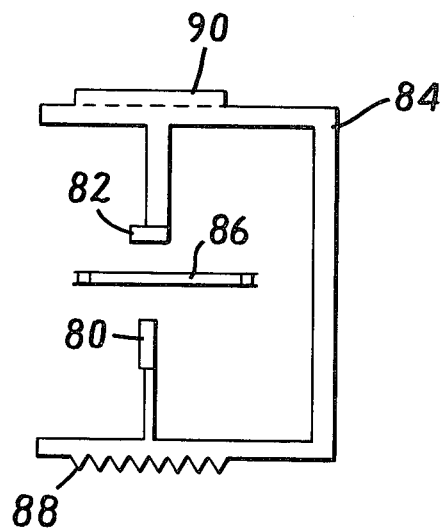
FIGS. 8 through 10 show apparatus for use in practicing the invention.

The apparatus of FIG. 8 may be employed to generate the foregoing signals. A pencil-beam radiant energy source 80 is arranged in fixed alignment with a radiant energy sensor 82 in a scanning mechanism 84. A developed film frame 86 is fixedly positioned intermediate source 80 and sensor 82. The scanning mechanism is moved relative to the film frame through x translational rack 88 and y translational rack 90, each rack being associated with a motor-driven pinion or the like suitably actuated for separate x and y scanning.

Figure 9:
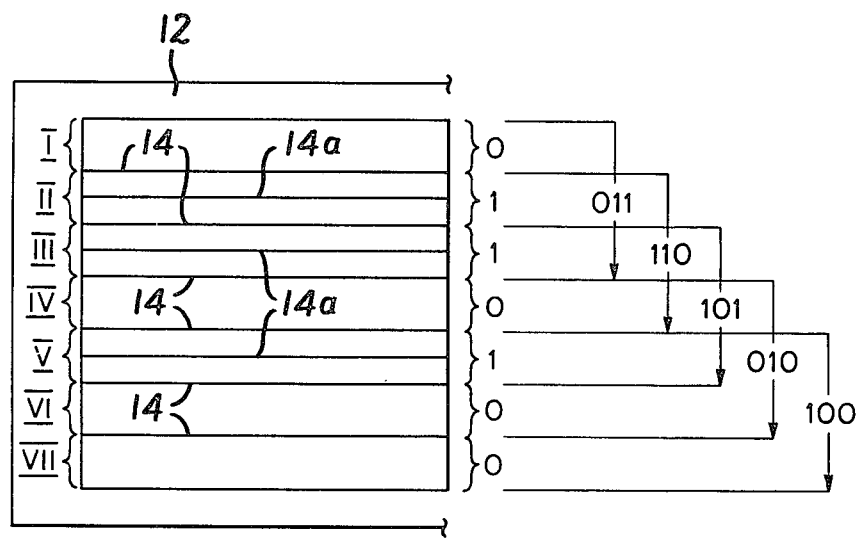

Referring to FIG. 9, a preferred form of reticle structure is shown adapted to avoid need for continuity of incremental counting throughout the cell span involved, and to provide ready determination of errors in cell sensing, e.g., where a longitudinal or lateral grid element is not sensed or is falsely sensed. For simplicity, only lateral grid elements are shown in FIG. 9.

As in the case of the reticle structure of FIG. 1, adjacent (first) lateral grid elements 14 of FIG. 9 define the longitudinal extents of the succession of cells I through VII. In preselected cells, e.g., cells II, III and V, further (second) lateral grid elements 14a are included giving rise to the pattern 0110100 for the cell succession, "0" indicating a cell not containing a second lateral grid element 14a and "1" indicating a cell including such second lateral grid element. In the particularly illustrated embodiment, all grid elements are discernible members, i.e., elements opaque or reflective to radiant energy incident thereon, grid elements 14a constituting means for encoding the reticle structure. Elements 14a are in number less than the number of cells in the succession. As shown to the right in FIG. 9, three bits provide distinct identification of the last five of the seven cells. Cell III has the characteristic identifying code 011, cell IV the code 110, cell V the code 101, cell VI the code 010 and cell VII the code 100.

Figure 7F:
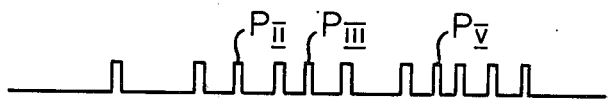

In the course of cell scanning in use of the FIG. 9 reticle, cell-defining signals are derived as above-discussed in connection with FIGS. 4 and 7(a). As shown in FIG. 7(f), the signals derived include the cell extent-defining pulses of FIG. 7(a) and are further inclusive of cell encoding pulses $P_{II}$, $P_{III}$ and $P_V$ in cells II, III and V. For convenience in discriminating between cell extent-defining pulses and cell encoding pulses, the pulse width or amplitude of the latter may be suitably different than that of the former. The FIG. 7(f) signal may be processed for cell identifying purposes in circuitry providing for successive readout of the three-bit patterns to the right in FIG. 9. As will be evident, provision by such circuitry, e.g., a three-bit register clocked by the cell extent-defining pulses, of the three-bit pattern 111, is indicative of an error in cell scanning since this pattern is unassigned.

As will be evident, need for continuous incremental counting of the entire cell span is eliminated where the reticle is encoded as in FIG. 9. Thus, determination of the regular graduation in the assigned code of each detected cell by its three-bit pattern permits one to look to a subsuccession less than the entire cell succession for identification of a given cell. This feature takes on particular significance where the cell succession is large in number, i.e., where continuous incremental cell counting is an onerous task requiring an extended capacity counter. The cell code assignment of FIG. 9 is preferred in practice according with this aspect of the invention. The FIG. 9 reticle structure may be generated by fine wire filaments as discussed above in connection with FIG. 1.

The reticle structure of FIG. 9 involves a progression of first cells having grid elements and second cells, not having grid elements, which progression will be recognized as a shift code. The exemplary seven cell progression follows the code 0110100, such as may be generated by a three-bit shift register shifted cyclically by EXCLUSIVE OR combination of the contents of two stages of the register. The subsuccession of cells which need be considered for cell identification, as referred to above, is coextensive with the number of stages of the shift register generating the code. Stated more generally, where the reticle is shift code encoded and where the total number of first and second cells, in the cell succession is P, each subsuccession of N cells embodies a distinct sequence of first and second cells, the relationship between P and N being established by the formula $2^N - 1 = P$.

Other reticle encoding than shift code encoding may of course be employed, however, with expansion of the subsuccession required to be looked to for identification of a given cell. For example, the reticle structure may be encoded such that the sequence of first and second cells in the cell succession is a pure binary progression. Considering the code generated by a three-bit binary counter as being inclusive of successive identifiers 000 and 001, it is apparent that one must look to the cell subsuccession of at least six cells for cell identification, as opposed to the N equal to three situation for an equal P number of cells in using the shift code.

As in the case of the FIG. 1 reticle structure, the FIG. 9 reticle structure, or like encoded reticle structure, may be employed in combination with discernible indicia in the generation of signals for use in determining positional coordinates of a given viewing location. Alternatively, the encoded reticle structure may be employed without such indicia for examining an object in a field of view extending through the encoded reticle structure. By way of example, a developed photograph of the object taken through the encoded reticle structure will evidence encoded cell successions superimposed on the object and providing ready distinction as between different portions of the object.

Figure 10:
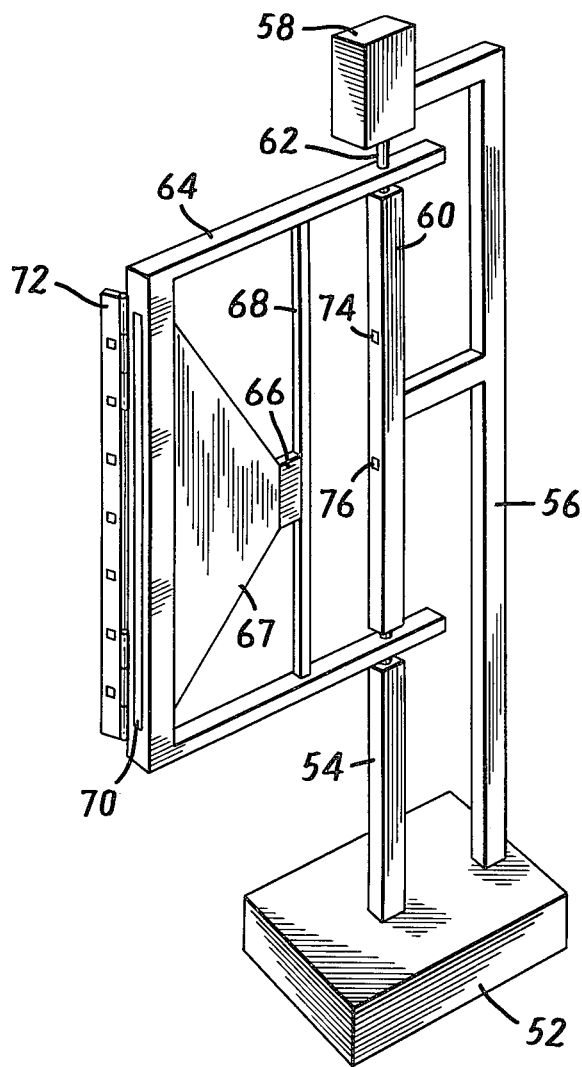

FIG. 10 shows an embodiment of particularly preferred apparatus for use in practicing the invention and especially for providing photographs having selective information content as shown in FIGS. 4–6. Base 52 of FIG. 10 provides a fixed seating for support members 54 and 56. At its upper end member 56 supports a motor 58 and intermediately supports a shaft housing 60. Output shaft 62 of motor 58 is fixedly secured, e.g., by keying, to reticle-defining framework 64, shaft 62 extending through housing 60 and further keyed to framework 64 below the lower extremity of housing 60. The shaft further extends into support member 54, support member 54 and housing 60 incorporating bearings enabling rotative movement of shaft 62 relative thereto.

Reticle framework 64 supports a lamp 66 and a fiber optic assembly 67 on framework strut 68. First ends of the fiber optic assembly are disposed adjacent the lamp and the remaining ends thereof are collected at framework window 70 being arranged such that, upon energization of the lamp with the framework stationary, a continuous vertical line of light is produced at window 70. An apertured window closure member 72 is hingedly connected to framework 64 and is illustrated in its open position. With the framework stationary and member 72 moved onto window 70 into its closed position, there issues from framework 64 a plurality of vertically displaced beams of light. Housing 60 is disposed in z-axis spaced relation to window 70 and supports vertically spaced lamps 74 and 76.

In use of the FIG. 10 apparatus in providing such as the photographs of FIGS. 4–6, member 72 is moved into its closed position and lamp 66 is energized, as is motor 58. As will be evident, framework 64 may be moved in essentially a complete circular path by motor 58 with resulting generation of a cylindrical light pattern defining lateral grid elements such as shown in planar fashion in FIG. 4.

Member 72 is now moved into its closed position and motor 58 is again energized. In the course of movement of framework 64 throughout its circular path, lamp 66 is periodically energized with resulting generation of a cylindrical light pattern defining longitudinal grid elements such as shown in planar fashion in FIG. 5.

With framework 64 now moved into its maximum clockwise or counterclockwise position and motor 58 and lamp 66 deenergized, lamps 74 and 76 are energized to define indicia akin to indicia 30 and 32. Separate photographs are taken of the lateral and longitudinal grid element patterns and of these indicia lamps 74 and 76.

The apparatus of FIG. 10 provided reticle structure which is three-dimensional and serves in use to enclose, partially or fully, a three-dimensional object under study, thus facilitating use of multiple cameras positionally interrelated through the reticle structure. In an exemplary application, multiple cameras may be placed in desired positional relationship with the FIG. 10 apparatus and the foregoing steps of energizing the apparatus may be sequentially practiced, photographs being taken by each of the cameras during each of the steps. The FIG. 10 apparatus is then deenergized and the object is placed in the fields of view of the cameras, and hence within the recorded reticle structure from which the foregoing positional coordinate indicating signals are generated. The object boundary surface is photographically examined by methods such as those discussed in the above-mentioned commonly-assigned patent application. On occurrences of intended camera movements or environmental disturbance causing camera displacement, the three-dimensional reticle may again be generated and examined by the cameras for ready redetermination of the lens node positional coordinates thereof.

Various changes and modifications may be introduced in the apparatus and practices discussed above without departing from the spirit and scope of the invention. By way of example, indicia 30 and 32 may be disposed in spaced relation to reticle frame 12 in the direction of the locations of interest as contrasted with the foregoing illustration in which the indicia are situated on a side of the reticle frame opposite the side thereof facing the locations of interest. The locations of issuance, i.e., the points of first visible propagation, of the light beams generated from window 70 and the light beams generated by lamps 74 and 76 may likewise be in mutually spaced alternating relation relative to the locations of interest. As referred to above, the cells may be of random extents and may be encoded in any desired manner. In discerning such random cells, the signal generation practice discussed in connection with FIGS. 4–8 is particularly effective since time slots are measured and indicate cell extents. In providing the indicia and grid elements with capacity for discernment thereof, they may be light-generating or opaque and reflective to light or, where energy other than light is employed, may be generative of or reflective to such other energy. The invention contemplates practices wherein multiple cameras may be arranged in viewing relation to a common object surface point for improved accuracy and wherein a single camera may successively view an object through reticle structure moved from one location relative to the object to a second different location relative to the object. The foregoing discussion is thus intended in a descriptive and not in a limiting sense. The invention is defined in the following claims.

What is claimed is:

1. Apparatus for generating signals for use in determining the positional coordinates of a given location having unknown positional coordinates comprising:
   a. reticle means for defining a plurality of separately discernible cells, each cell defining a predetermined distinct extent of a field of view extending from said given location to said reticle means;
   b. means for defining a discernible indicium;
   c. means for spacedly positioning said reticle means and said indicium defining means in said field of view; and
   d. means for generating a signal indicative of the one of said cells defining the extent of said field of view inclusive of the line optical path extending from said given location to said indicium.

2. The apparatus claimed in claim 1 wherein said reticle means includes a plurality of intersecting lateral and longitudinal elements opaque to light energy and disposed in a common plane, each said cell being defined by an adjacent pair of said lateral elements and an adjacent pair of said longitudinal elements.

3. The apparatus claimed in claim 2 wherein said indicium defining means includes a light source generating a beam of light energy defining said indicium, said positioning means supporting said reticle means and said indicium defining means such that said light source is spaced from said lateral and longitudinal elements on an axis intersecting the plane of said lateral and longitudinal elements.

4. The apparatus claimed in claim 1 wherein said reticle means comprises a first light source and means cooperative with said first light source for generating a plurality of intersecting lateral and longitudinal first beams of light energy and defining window means for issuing said first beams of light energy, each said cell being defined by an adjacent pair of said lateral first beams and an adjacent air of said longitudinal first beams.

5. The apparatus claimed in claim 4 wherein said indicium defining means includes a second light source generating a second beam of light energy defining said indicium, said positioning means supporting said reticle means and said indicium defining means such that said second light source is spaced from said window means.

6. A method for generating signals for use in determining the positional coordinates of a given location having unknown positional coordinates, comprising the steps of:
   a. disposing a discernible indicium in a location having known positional coordinates;
   b. establishing a lens field of view extending from said given location to said indicium;
   c. subdividing said lens field of view into predetermined distinct extents; and
   d. generating a signal indicative of that predetermined extent of said field of view inclusive of the line optical path extending from said given location to said indicium.

7. The method claimed in claim 6 wherein said step (b) is practiced to provide said distinct extents in a preselected succession, said method including the further step of encoding said distinct extents in a manner identifying the order of each thereof in said succession.

8. A method for generating signals for use in determining the positional coordinates of a given location having unknown positional coordinates, comprising the steps of:

a. disposing first and second discernible indicia in respective first and second locations having known positional coordinates;
b. establishing a lens field of view extending from said given location to said indicia;
c. subdividing said lens field of view into first extents successive along one positional coordinate axis and into second extents successive along a second positional coordinate axis; and
d. generating first signals indicative of the order in such succession of said first field of view extents of the extents thereof inclusive of the line optical paths extending respectively from said given location to said first and second indicia and a second signal indicative of the order in such succession of said second field of view extents of the extents thereof inclusive of the line optical paths extending respectively from said given location to said first and second indicia.

9. The method claimed in claim 8 wherein said step (d) is practiced in part by making a photographic record from said given location indicative of said field of view extents and said indicia.

10. The method claimed in claim 8 wherein said step (c) is practiced by disposing in said lens field of view a plurality of intersecting lateral and longitudinal elements opaque to light energy and disposed in a common plane, each said cell being defined by an adjacent pair of said lateral elements and an adjacent pair of said longitudinal elements.

11. The method claimed in claim 10 wherein said step (a) is practiced by disposing in said first and second locations light sources generating therefrom a beam of light energy defining said indicia.

12. The method claimed in claim 8 wherein said step (c) is practiced by generating a plurality of intersecting lateral and longitudinal beams of light energy.

13. The method claimed in claim 12 wherein said step (a) is practiced by disposing in said first and second locations light sources generating therefrom further beams of light energy defining said indicia, said beams of light energy generated in practice of said step (c) being issued from an issuance location spaced from said first and second locations.

14. Reticle structure for use in examining an object comprising:
a. means for defining a succession of contiguous separately discernible cells, each cell defining a predetermined distinct extent of a field of view extending through said reticle structure, said cells collectively defining said field of view extending through said reticle structure;
b. means for encoding said succession of cells for identifying the order of cells in said succession, said encoding means comprising discernible members individually disposed in preselected first of said cells, the remainder of said cells comprising second cells, the number of said discernible members being less than the total number of said first and second cells in said succession;
c. means for defining a discernible indicium; and
d. means for spacedly positioning said means (c) and said means (a) in said field of view.

15. The reticle structure claimed in claim 14 wherein the total number of said first and second cells is P and wherein each subsuccession of N of said cells has a distinct sequence of said first and second cells, the relationship between P and N being established by the formula:
$$2^N - 1 = P.$$

16. The reticle structure claimed in claim 14 wherein the sequence of said first and second cells in said cell succession is a binary sequence.

* * * * *